US011057098B2

(12) United States Patent
Mobasher et al.

(10) Patent No.: US 11,057,098 B2
(45) Date of Patent: *Jul. 6, 2021

(54) METHODS OF ANTENNA SYSTEM CONTROL IN MASSIVE MIMO SYSTEMS

(71) Applicant: Avago Technologies International Sales Pte. Limited, Singapore (SG)

(72) Inventors: Amin Mobasher, Sunnyvale, CA (US); Sam Alex, Sunnyvale, CA (US); Louay Jalloul, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 87 days.

This patent is subject to a terminal disclaimer.

(21) Appl. No.: 16/417,848

(22) Filed: May 21, 2019

(65) Prior Publication Data

US 2019/0273551 A1    Sep. 5, 2019

Related U.S. Application Data

(63) Continuation of application No. 14/037,903, filed on Sep. 26, 2013, now Pat. No. 10,326,513.

(51) Int. Cl.
   *H04B 7/06*      (2006.01)
   *H04B 7/04*      (2017.01)
   *H04B 7/0413*    (2017.01)

(52) U.S. Cl.
   CPC ......... *H04B 7/0691* (2013.01); *H04B 7/0413* (2013.01)

(58) Field of Classification Search
   CPC .. H04B 1/0483; H04B 7/0413; H04B 7/0404; H04B 7/0452; H04W 56/0015; H04W 56/006
   See application file for complete search history.

(56) References Cited

U.S. PATENT DOCUMENTS

| 2013/0315076 | A1* | 11/2013 | Zhao etal. ..................... 370/252 |
| 2014/0056381 | A1* | 2/2014 | Wang ............................ 375/295 |
| 2014/0140424 | A1* | 5/2014 | Clevorn ........................ 375/267 |
| 2015/0085944 | A1 | 3/2015 | Mobasher et al. |

* cited by examiner

*Primary Examiner* — Zhitong Chen
(74) *Attorney, Agent, or Firm* — Morgan, Lewis & Bockius LLP

(57) ABSTRACT

A multiple input multiple output (MIMO) antenna system is implemented for communications in a wireless device. Information regarding the environment surrounding the wireless device may be used to determine which of the MIMO antennas are selected such that communications performance is improved. Metrics related to signal transmission and reception by the wireless device may be monitored and used to determine which MIMO antennas are selected. The metrics may be measured by any of the MIMO antennas at any time, including antennas currently engaged or not engaged in active communications. The metrics may be used in lieu of sensors to supplement or replace wireless device functionality otherwise provided by the sensors.

20 Claims, 6 Drawing Sheets

METHODS OF ANTENNA SYSTEM CONTROL IN MASSIVE MIMO SYSTEMS

CROSS REFERENCE TO RELATED APPLICATIONS

This application is a continuation of U.S. patent application Ser. No. 14/037,903, filed Sep. 26, 2013, which is incorporated by reference herein in its entirety.

FIELD OF DISCLOSURE

The present disclosure relates generally to multiple-input multiple-output (MIMO) antenna systems and more specifically to the selection of different antennas within a MIMO antenna group to improve wireless communications performance.

BACKGROUND

MIMO systems are often used to improve wireless communications performance between one or more devices. In a MIMO system, a first communication device, such as a user equipment (UE) may have more than one antenna (e.g., 2, 4, 8, etc.) for communicating with a second communication device, such as a base station. The second communication device may also be equipped with more than one antenna. The first and the second communication devices may utilize several of their respective antennas simultaneously to facilitate MIMO communications. In massive MIMO (M-MIMO), the first and/or second communication device has a large number of antennas (e.g., 100).

During communications between the two communication devices, the propagation environment and/or the environment proximate to one or both of the communication devices may change. These changes may negatively impact communications performance.

BRIEF DESCRIPTION OF THE DRAWINGS/FIGURES

Figure 1A:
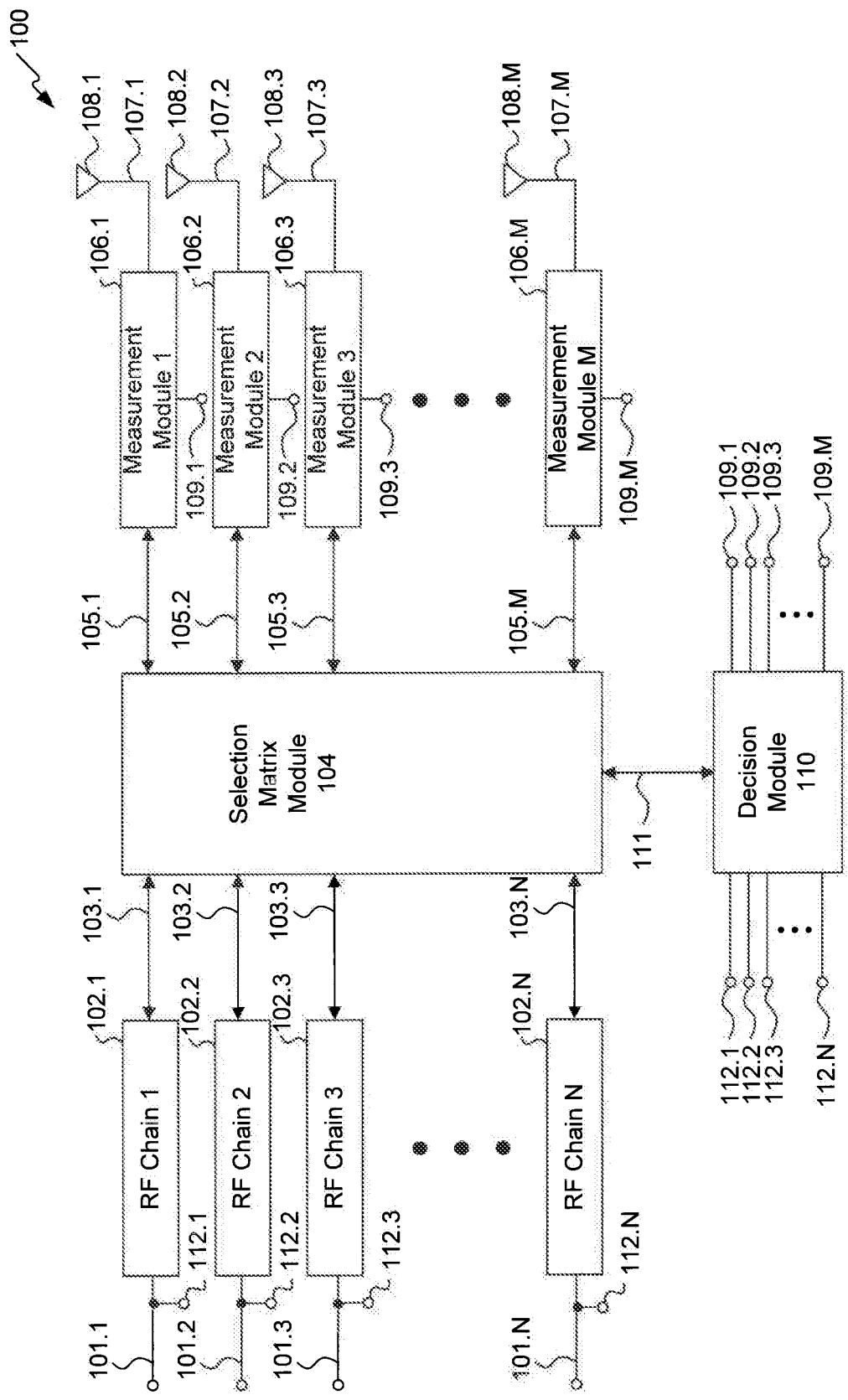
FIG. 1A illustrates a MIMO system according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

FIG. 1A illustrates a MIMO system 100 according to an exemplary embodiment of the disclosure. MIMO system 100 includes N RF chains 102.1-102.N, a selection matrix module 104, M measurement modules 106.1-106.M, M antennas 108.1-108.M, and a decision module 110. Although separate integer designations 'N' and 'M' are used in FIG. 1A to illustrate the number of corresponding ports and elements of MIMO system 100, these numbers may be the same or different from one another. In an exemplary embodiment of the present disclosure, the number of RF chains 102.1-102.N is equal to a number of measurement modules and antennas 106.1-106.M and 108.1-108.M, respectively.

RF chains 102.1-102.N are configured to facilitate communications between MIMO system 100 and another communication device. In an exemplary embodiment of the present disclosure, MIMO system 100 is implemented within a UE, and RF chains 102.1-102.N facilitate communications between the UE and a base station.

As will be appreciated by one of ordinary skill in the art, each of RF chains 102.1-102.N may be implemented with any number of modulators, mixers, power amplifiers, drivers, demodulators, processors, frequency synthesizers, phase-locked loops (PLLs), and/or switches to provide for any level of communications processing. Each of RF chains 102.1-102.N may be configured to switch between transmit and receive modes of operation as needed via a switching input. A switching input is not shown in FIG. 1A.

RF chains 102.1-102.N are configured to handle transmission and reception between MIMO system 100 and another communication device. More specifically, RF chains 102.1-102.N interface to a processor (e.g., a baseband processor) via corresponding ports 101.1-101.N. Ports 101.1-101.N may be implemented with any number of wired buses and/or transmission lines, for example. The processor is not shown in FIG. 1A, but may provide data to be modulated and transmitted via RF chains 102.1-102.N via each of respective ports 101.1-101.N when RF chains 102.1-102.N are configured for data transmission. Similarly, RF chains 102.1-102.N may also provide demodulated data to the processor for further processing via ports 101.1-101.N.

MIMO system 100 may be implemented as part of any type of MIMO system or as a combination of systems. As will be appreciated by those of ordinary skill in the art, each of RF chains 102.1-102.N may be configured based on the type of MIMO system 100 in which they are implemented. For example, each of RF chains 102.1-102.N may operate at any frequency or band of frequencies, which may be different from one another. Furthermore, RF chains 102.1-102.N may carry the same signal or different signals. For example, for implementation of a precoding MIMO system, each of RF chains 102.1-102.N may transmit and/or receive the same signals. To provide another example, in a spatial multiplexing system, each of RF chains 102.1-102.N may transmit and/or receive a lower rate stream which are split from a higher rate stream. To provide a further example, in a diversity coding system, each of RF chains 102.1-102.N may transmit and/or receive a single data stream that are space-time coded such that the transmitted and/or received signals utilize orthogonally encoding.

Each of RF chains 102.1-102.N is also coupled to selection matrix module 104 via corresponding ports 103.1-103.N. To facilitate MIMO beamforming techniques, selection matrix module 104 is configured to couple any of RF chains 102.1-102.N to any of the measurement modules 106.1-106.M by coupling any of RF ports 105.1-105.M to any of ports 103.1-103.N.

Selection matrix module 104 is configured to couple any number of ports 103.1-103.N to any number of corresponding RF ports 105.1-105.M in response to control signals received from decision module 110 via a decision module port 111. In an exemplary embodiment of the present disclosure, selection matrix module 104 is configured to couple any single RF port from among ports 103.1-103.N to a single corresponding RF port from among RF ports 105.1-105.M, forming a one-to-one relationship coupling between these ports.

In another exemplary embodiment of the present disclosure, selection matrix module 104 is configured to couple any number of ports 103.1-103.N to any number of RF ports 105.1-105.M in a non-one-to-one relationship. For example, in accordance with such an embodiment, selection matrix module 104 may couple two or more of ports 103.1-103.N to a single RF port from RF ports 105.1-105.M. In this way, selection matrix module 104 allows for more than one RF chain to share a single antenna.

In accordance with an embodiment implementing a non-one-to-one relationship, selection matrix module 104 may couple two or more antennas to a single RF port from among ports 103.1-103.N. In this way, selection matrix module 104 allows for more than one antenna to share a single RF chain. Selection matrix module 104 may adjust the coupling relationship between ports 103.1-103.N to RF ports 105.1-105.M at any time. For example, selection matrix module 104 may couple two RF chains to a single antenna when the RF chains are receiving communications, and then couple two antennas to a single RF chain when an RF chain is transmitting, or vice-versa.

To facilitate embodiments of the present disclosure whereby antennas and/or RF chains are shared in a non-one-to-one relationship, selection matrix module 104 may be implemented as having any number of couplers, splitters, hybrids, diplexers, and/or circulators. In this way, selection matrix module 104 may combine or split RF signals from any combination of one or more RF chains 102.1-102.N to any combination of one or more antennas 108.1-108.M.

Selection matrix module 104 may modify any number of signal transmission parameters and/or transmission profiles within MIMO system 100 in response to control signals received from decision module 110 via a decision module port 111. A transmission signal parameter may include any characteristic of signals to be transmitted via any of antennas 108.1-108.M. For example, a transmission signal parameter may include an amplitude, frequency, and/or phase of a transmitted signal. A transmission profile relates to a type of MIMO transmission. A transmission profile may be associated with a specific coding and/or multiplexing system. For example, a transmission profile may be associated with a particular multiplexing scheme having any coding rate and/or rank.

In accordance with an exemplary embodiment of the present disclosure, selection matrix module 104 communicates with any of RF chains 102.1-102.N via ports 103.1-103.N to control the adjustment of the transmission signal parameters and/or profiles. For example, selection matrix module 104 may control a gain setting of any of RF chains 102.1-102.N to obtain a desired amplitude value. To provide another example, selection matrix module 104 may control a number of data streams transmitted by RF chains 102.1-102.N and their correlation when coupled to any of antennas 108.1-108.M. In this way, selection matrix module may adjust a type of multiplexing scheme coding rate, and/or rank at any time.

In accordance with an exemplary embodiment of the present disclosure, selection matrix module adjusts transmission signal parameters and/or transmission profiles independently of RF chains 102-1.102.N. In accordance with such an embodiment, selection matrix module 104 may include any number of attenuators, amplifiers, scalers, and/or phase-shifters to facilitate such adjustments.

Measurement modules 106.1-106.M are coupled to selection matrix module 104 via RF ports 105.1-105.M, and to antennas 108.1-108.M via RF ports 107.1-107.M. Measurement modules 106.1-106.M are also coupled to decision module 110 via measurement module ports 109.1-109.M.

As will be appreciated by those of ordinary skill in the art, each of measurement modules 106.1-106.M may include any number of impedance matching circuits, amplifiers, drivers, couplers, switchable directional and/or bidirectional couplers, circulators, sampling circuits, analog-to-digital converters (ADCs), digital-to-analog converters (DACs), power meters, and/or receivers to measure transmission and/or reception signal metrics such as standing wave ratio (SWR) at any of RF ports 107.1-107.M, bit error rate (BER), received signal strength indication (RSSI) signal-to-noise ratio (SNR), and/or signal-to-noise-plus-interference ratio (SINR).

Although FIG. 1A illustrates M number of measurement modules 106.1-106.M coupled to M number of antennas 108.1-108.M in a one-to-one relationship, MIMO system 100 may include any number of measurement modules 106.1-106.M that may be coupled to any of antennas 108.1-108.M. For example, measurement modules 106.1-106.M may be implemented as a single consolidated measurement module that is coupled to each of antennas 108.1-108.M, or any number of measurement modules less than M that are configured to measure communication performance metrics and to communicate the communication performance metrics to decision module 110.

Each of measurement modules 106.1-106.M may be configured to measure any number of communication performance metrics related to the communications between the MIMO system 100 and another communication device and/or performance of any component of MIMO system 100. To provide an example, these communication performance metrics may include any number of non-signal metrics such as antenna performance measurements. To provide another example communication performance metrics may include communication signal metrics related to transmission and/or reception of signals between any of RF chains 102.1-102.N and antennas 108.1-108.M. Measurement modules 106.1-106.M are configured to provide these communication performance metrics to decision module 110 via measurement module ports 109.1-109.M. Measurement modules 106.1-106.M may be configured to measure communication performance metrics in the analog and/or the digital domain and to provide this information in analog and/or digital form to decision module 110 via measurement module ports 109.1-109.M.

Any number of antennas 108.1-108.M may be utilized for communications between MIMO system 100 and another communication device. In an exemplary embodiment of the present disclosure, a first subset of antennas 108.1-108.M is utilized for communications. During communications, this first subset of antennas from among antennas 108.1-108.M is coupled to any number of RF chains 102.1-102.N as a result of the port coupling performed by selection matrix module 104. While the first subset of antennas from antennas 108.1-108.M are utilized for active communications, a second subset of antennas is formed from any number of the remaining antennas that are not coupled to any of RF chains 102.1-102.N, and thus are not being utilized for communications.

In an exemplary embodiment of the present disclosure, each of the measurement modules 106.1-106.M is configured such that parameters may be measured at any time. In other words, each of measurement modules 106.1-106.M may measure a communication performance metric regardless of whether it is coupled to an antenna that is being utilized for communications.

In accordance with an exemplary embodiment of the present disclosure, any number of measurement modules 106.1-106.M coupled to antennas from the first subset (which is being used for communications) may measure communication performance metrics corresponding to their respective coupled RF chains. Further in accordance with such an embodiment, any number of measurement modules 106.1-106.M coupled to antennas from the second subset (which is not being used for communications) may measure communication performance metrics corresponding to transmissions via the first subset of antennas and/or signals received from another device that is in communications with MIMO system 100.

In accordance with an embodiment whereby measurement modules 106.1-106.M coupled to the first subset of antennas perform measurements, such a measurement module may compare the forward and reverse power coupled between RF ports 105.1-105.M and RF ports 107.1-107.M (the direction depending upon the operating mode being transmission or reception) to obtain an SWR value as the communication performance metric.

To provide further examples, each of measurement modules 106.1-106.M may be implemented with any number of receivers that may be configured to operate at the same frequency, or band of frequencies, as RF chains 102.1-102.N. Using these receivers, the signal strength received at any of the first subset of antennas may be sampled to provide an RSSI value. To provide further examples, measurement modules 106.1-106.M may utilize a power meter and/or a receiver to measure the received signal, noise, and interference power levels received at RF ports 107.1-107.M that are coupled to the first antenna subset. These power levels may be utilized to provide a SNR and/or a SINR value as the communications performance metric.

In accordance with another embodiment of the present disclosure, any number of measurement modules 106.1-106.M that are coupled to the antennas within the second subset (which is not being used for communications) may measure a communications performance metric corresponding to communications between the second subset of antennas and another communication device, such as a base station, for example. These measurements may be made alternatively or in addition to the measurements made by modules 106.1-106.M which are coupled to the first subset of antennas. In other words, while the second subset of antennas is not actively involved in communications, those measurement modules 106.1-106.M coupled to the second subset of antennas may measure communication performance metrics while the first subset of antennas is utilized for the active communications.

In accordance with an embodiment of the present disclosure, to measure transmission signal metrics, those measurement modules 106.1-106.M coupled to antennas from the second subset of antennas sample signals transmitted from antennas within the first subset of antennas. That is, since antennas 108.1-108.M are generally positioned in relatively close proximity to one another, some amount of RF signals transmitted via antennas within the first subset will couple back into antennas within the second subset. Since receivers within measurement modules 106.1-106.M may be tuned to the same frequency or band of frequencies as those of RF chains 102.1-102.N, signals transmitted via the first antenna subset may be received and processed via measurement modules coupled to antennas from the second subset. For example, those of measurement modules 106.1-106.M that are unused for communications may sample signals transmitted from antennas in the first subset and determine a SNR value from these sampled signals as the communications performance metric.

In accordance with an embodiment of the present disclosure, to measure reception communication performance metrics, those measurement modules 106.1-106.M that are coupled to antennas within the second subset sample signals that are transmitted from another communication device that is in communications with the MIMO system 100. For example, those of measurement modules 106.1-106.M that are unused for communications may sample signals transmitted from the other device and determine an RSSI value using the sampled signals as the communications performance metric.

Antennas 108.1-108.M may be implemented as any type of antenna capable of facilitating communications between MIMO system 100 and another communication device. Although illustrated as single antenna elements, each antenna from among antennas 108.1-108.M may be implemented as any number or combination of single and/or multi-band antenna elements. Antennas 108.1-108.M may be implemented, for example, using printed and/or patch antenna elements.

Although FIG. 1A illustrates measurement modules 106.1-106.M being coupled between selection matrix module 104 and antennas 108.1-108.M, measurement modules 106.1-106.M may also be coupled between RF chains 102.1-102.N and selection matrix module 104. Furthermore, measurement modules 106.1-106.M may be implemented within any of the components shown in FIG. 1A. For example, measurement modules 106.1-106.M may be integrated within RF chains 102.1-102.N. To provide another example, measurement modules 106.1-106.M may be integrated within selection matrix module 104 or within decision module 110. In such embodiments, RF ports 107.1-107.M may be coupled directly to RF ports 105.1-105.M.

Decision module 110 is coupled to selection matrix module 104 via decision module port 111. Decision module 110 is coupled to ports 101.1-101.N via ports 112.1-112.N. Decision module 110 may be implemented as a processor, for example. Decision module 110 may be implemented within any of the components shown in FIG. 1. For example, decision module 110 may be integrated as a part of selection matrix module 104. To provide another example, decision module 110 may be implemented as part of another processor, such as a baseband processor that is coupled to RF chains 102.1-102.N via ports 101.1-101.N. Again, the baseband processor is not shown in FIG. 1.

Decision module 110 is configured to sample signals transmitted and received via the respective RF chains 102.1-102.N through ports 112.1-112.N. Decision module 110 is configured to utilize these sampled signals to measure and/or calculate one or more operating parameters, transmission parameters, in the analog and/or the digital domain. Decision module may analyze these sampled signals to determine a transmission profile. Decision module 110 processes the communication performance metrics and/or operating parameters that are associated with communications between MIMO system 100 and another communication device. Decision module controls the transmission parameters, the transmission profile, and/or the couplings between ports 103.1-103.N and RF ports 105.1-105.M by controlling selection matrix module 104 via decision module port 111. Decision module 110 utilizes the communication performance metrics and/or operating parameters to determine this coupling.

The operating parameters measured and/or calculated by decision module 110 may include any setting or operational metric related to the operation of RF chains 102.1-102.N. For example, operating parameters may include a gain setting (e.g., an automatic gain control (AGC) setting) of one or more amplifiers implemented within RF chains 102.1-102.N. To provide additional examples, the operating parameters may include a baseband frequency value, a band of frequencies of operation, a carrier frequency value, filter settings and/or coefficients, transfer functions, and/or amplifier settings such as voltage and/or current driver values.

Alternatively, or in addition to such information, decision module 110 may determine the correlation of RF chains 102.1-102.N to antennas 108.1-108.M using information received from selection matrix module 104. For example, an addressing system may be implemented whereby each of RF chains 102.1-102.N and measurement modules 106.1-106.M has a unique address. Decision module 110 may utilize such address information received from selection matrix module 104 to identify which antennas are active, which antennas are not active, and the coupling state between RF chains 102.1-102.N to antennas 108.1-108.M at any given time.

As will be appreciated by those of ordinary skill in the art, certain communication performance metrics and operating parameters may be considered a more reliable indication of communications performance than others. Therefore, decision module 110 may prioritize different types of communication performance metrics and/or operating parameters when controlling port selection for selection matrix module 104. For example, an operating parameter indicative of a higher AGC value for an associated transmission driver within an RF chain may result in decreased or increased SINR depending on the amount of in-band noise. Decision module 110 may be configured to weight and/or prioritize a signal metric such as SINR greater than an operating parameter such as AGC value. In such an embodiment, decision module 110 would only switch an RF chain when both the AGC value has increased above a corresponding threshold and the SINR falls below a corresponding threshold. As will be appreciated by those of ordinary skill in the art, appropriate thresholds may be chosen for operating parameters and/or communication performance metrics based on a particular application.

Decision module 110 may be configured to determine RF port couplings from any combination of communication performance metrics and/or operating parameters. Decision module 110 may make a determination based on only operating parameters, only communication signal parameters, or a combination of both. Decision module 110 may control selection matrix module 104 to reconfigure the coupling of an RF chain to another unused antenna which provides better communications performance based on the communication performance metrics and/or operating parameters.

In accordance with an embodiment of the present disclosure, decision module 110 compares communication performance metrics from those measurement modules 106.1-106.M that are coupled to actively communicating antennas from antennas 108.1-108.M (constituting the first subset of antennas) to communication performance metrics from those measurement modules 106.1-106.M that are coupled to non-communicating antennas from antennas 108.1-108.M (constituting the second subset of antennas). By comparing performance metrics in this way, decision module 110 may control selection matrix module 104 to adjust the coupling of RF chains 102.1-102.N from antennas within the first subset to any of antennas 108.1-108.M, such as antennas within the second subset, for example, if the communication performance metrics indicate that doing so would improve communications performance.

For example, assume that RF chain 102.1 is coupled to antenna 108.1 via selection matrix module 104 to facilitate communications between MIMO system 100 and another communication device. Measurement module 106.1 provides communication performance metrics to decision module 110 regarding such communications via measurement module port 109.1. If none of the remaining RF chains 102.2-102.N are coupled to any of antennas 108.1-108.M, any of measurement modules 106.2-106.M may measure communication performance metrics using each respective antenna, and communicate this information to decision module 110 via measurement module ports 109.2-109.M.

Decision module 110 then compares the communication performance metrics from any one of measurement modules 106.2-106.M to the communication performance metrics from measurement module 106.1. If decision module 110 determines that any of the presently unused antennas 108.1-108.M would be better suited for communications between MIMO system 100 and the other communication device than antenna 108.1, then decision module 110 controls selection matrix module 104 to switch the coupling of RF chain 102.1 to one of these other antennas 108.2-108.M. In accordance with an embodiment of the present disclosure, decision module 110 controls selection matrix module 104 to couple RF chains 102.1-102.N to antennas 108.1-108.M which provide communication performance metrics indicative of the best communications performance.

Alternatively, or in addition to controlling the coupling of RF chains 102-1-102.N to antennas 108.1-108.M, decision module 110 may determine and adjust one or more transmission parameters and/or transmission profiles based on the communication performance metrics. For example, if the communication performance metrics indicate low received signal levels, decision module 110 may control selection matrix module 104 to adjust the transmission parameters and/or transmission profile such that communications are better suited for such an environment. That is, in an example in which low received signal levels are detected, decision module 110 may cause selection matrix module 104 to adjust the transmission profile to a lower rank and/or coding rate to compensate.

Decision module 110 may utilize transmission signal and/or reception signal metrics provided by measurement modules 106.1-106.M that are coupled to the second subset of antennas to make this decision. For example, decision module 110 may analyze transmission signal metrics, such as SINR, measured by those measurement modules 106.1- 106.M coupled to antennas from the second subset that are representative of signals transmitted via the first subset of antennas. By comparing these SINR values, decision module 110 may determine which of the antennas within the second subset would be best suited for communications. These communication performance metric values may be analyzed along with transmission/reception signal metrics measured from those measurement modules 106.1-106.M that are coupled to antennas within the first subset and/or calculated operating parameters corresponding to the antennas within the first subset. If the transmission/reception signal metrics and/or operating parameters indicate poor communications performance at any of the first subset of antennas (e.g., low BER, SINR, SNR, RSSI) then decision module 110 may make the coupling decision based on those antennas within the second subset associated with the best sampled transmission signal metric value.

In accordance with an exemplary embodiment of the present disclosure, decision module 110

To provide another example, decision module 110 may analyze reception signal metrics such as RSSI from each unused antenna that is representative of a signal strength of signals transmitted by another communication device to MIMO system 100. By comparing these RSSI values, decision module 110 may determine which of the unused antennas would be best suited for communications. These values may be analyzed along with transmission/reception signal metrics and/or operating parameters from the antennas which are being used for communications. If the transmission/reception signal metrics and/or operating parameters indicate poor communications performance (e.g., low BER, SINR, SNR, RSSI) then decision module 110 may make the coupling decision based on which of the unused antennas was associated with the best sampled reception signal metric value.

Once an RF chain is switched from one antenna to another, the previously active antenna may continue to measure communication signal parameters. In other words, in the previous example, antenna 108.1 was initially used for communications, and thus is considered the first subset of antennas. The remaining antennas 108.2-108.M not being used for communications are considered the second subset of the antennas. Once selection matrix module 104 couples RF chain 102.1 to antenna 108.2, antenna 108.2 is considered the first subset of antennas, and antennas 108.1 and 108.3-108.M are the second subset of antennas. In other words, once antennas are no longer used for active communications, these antennas continue to measure communication signal parameters. In this way, MIMO system 100 provides for dynamic monitoring and switching of antennas 108.1-108.M to continuously monitor communications performance and re-select antennas which provide improved communications performance.

Figure 1B:
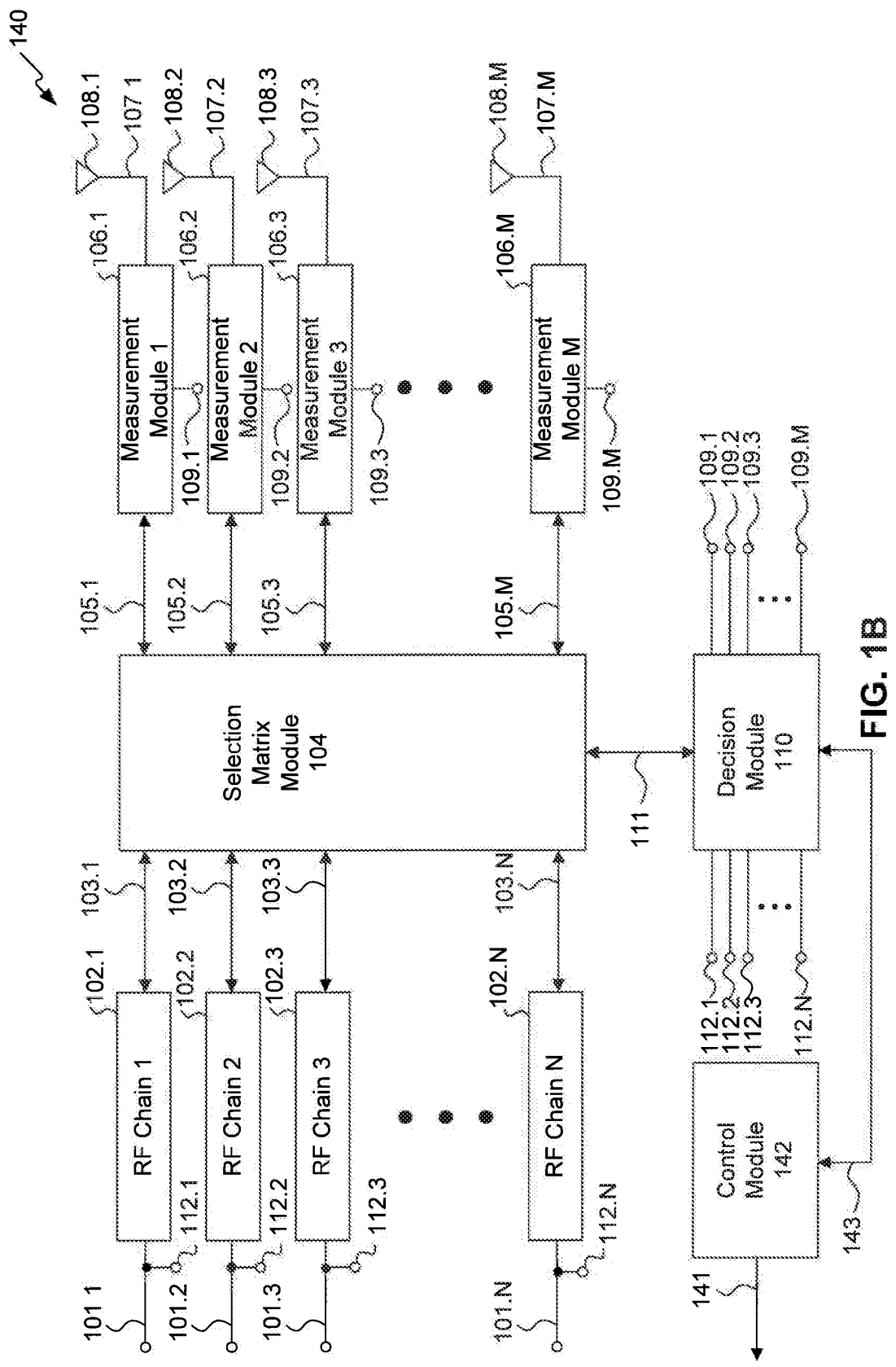
FIG. 1B illustrates a MIMO system that controls functionality of a communication device according to an exemplary embodiment of the disclosure.

FIG. 1B illustrates a MIMO communications system 140 that controls functionality of a communication device according to an exemplary embodiment of the disclosure. MIMO system 140 includes the same components as MIMO system 100, and additionally includes a control module 142. MIMO system 140 operates in substantially the same manner as MIMO system 100. Therefore, only differences between MIMO system 100 and MIMO system 140 will be described.

In accordance with an embodiment of the present disclosure, MIMO system 140 may be implemented as part of a UE, such as a smartphone or tablet, for example. In accordance with such an embodiment, antennas 108.1-108.M may be located in several different locations of the UE. For example, antennas 108.1-108.M may be located on the sides or back of the UE, or installed in locations proximate to a display screen. Decision module 110 and/or control module 142 may be configured to correlate antennas 108.1-108.M with a known position of the antennas within the device in which MIMO system 140 is implemented. For example, decision module and/or control module 142 may associate antenna 108.1 as being positioned behind the UE's display, and antenna 108.2 as being positioned at the top of the UE.

Control module 142 is coupled to decision module 110 via control module port 143, and to other functional elements of the device in which MIMO system 140 is implemented via control module port 141. Control module ports 141 and 142 may be implemented with any number of wired buses and/or transmission lines, for example. Control module 142 may be programmed with antenna position information, or control module 142 may determine this information by communicating with decision module 110.

Control module 142 is configured to control settings of any component of the device in which MIMO system 140 is implemented. These settings may include, for example, screen brightness, power settings, sound settings, volume settings, communication settings of a UE, such as "airplane mode" and "active mode," switching the routing of sound between a speaker or an earpiece, entry and exit from sleep mode, radio settings, such as disabling and enabling of any number of radios used by a UE such as BLUETOOTH, Near Field Communications (NFC), Wi-Fi, and/or Frequency Modulation (FM) radio, for example. Control module 142 may be coupled to a processor (e.g., a host processor) within the device in which MIMO system 140 is implemented via control module port 141, the processor being configured to forward commands received from control module 142 to facilitate such control. Alternatively, or in addition to communications with a processor, control module 142 may be coupled to any number of components via control module port 141 to establish control of the respective components either directly or indirectly.

Decision module 110 and/or control module 142 may determine changes in environmental conditions proximate to MIMO system 140 by monitoring the communication performance metrics. For example, if MIMO system 140 is implemented within a UE, such as a smartphone or tablet, the placement of the UE near other devices will affect the communication performance metrics. Setting the UE on a metal table, holding the UE close to a user's ear during a conversation, placing one's hands on the UE to type, and placing the UE in a pocket, for example, will impact the communication performance metrics in each case. More specifically, the communication performance metrics associated with antennas that are closest to other objects, such as a user's leg, hands, face, or a metallic object, may be more adversely affected than antennas which are not.

By monitoring changes in communication performance metrics as a result of changes in such environmental conditions, control module 142 may control the various components to effectuate a desired operation of the device in which MIMO system 140 is implemented. For example, if communication performance metrics are indicative that a UE, such as a smartphone for example, is placed against a user's ear, control module 142 may cause the smartphone touchscreen to turn off to prevent incidental contact from causing undesired touchscreen input. To provide another example, control module 142 may set the UE sound settings to "vibrate" if it is determined that the UE is in a user's pocket.

Since each of measurement modules 106.1-106.M may utilize a receiver configured to operate within any frequency, or band of frequencies, the communication performance metrics may be in-band or out-of-band signal metrics. For example, communication performance metrics may indicate the presence of signals transmitted by a base station in communication with the MIMO system 140, or the presence of signals in the Wi-Fi, FM, and/or NFC bands. Based on these types of communication performance metrics, control module 142 may enable or disable various radio component settings of a UE. To provide an example, control module 142 may place a UE into "airplane mode," if the communication performance metrics are indicative that no base station is within communications range of the UE for a certain period of time. To provide another example, control module 142 may activate a Wi-Fi radio of the UE only when the UE is within range of a Wi-Fi access point.

Control module 142 therefore provides a way to control components of a device in which MIMO system 140 is implemented. In this way, control module 142 may eliminate the need for one or more sensor components that would otherwise provide feedback regarding the environment of the MIMO system 140, thereby saving costs.

Figure 1C:
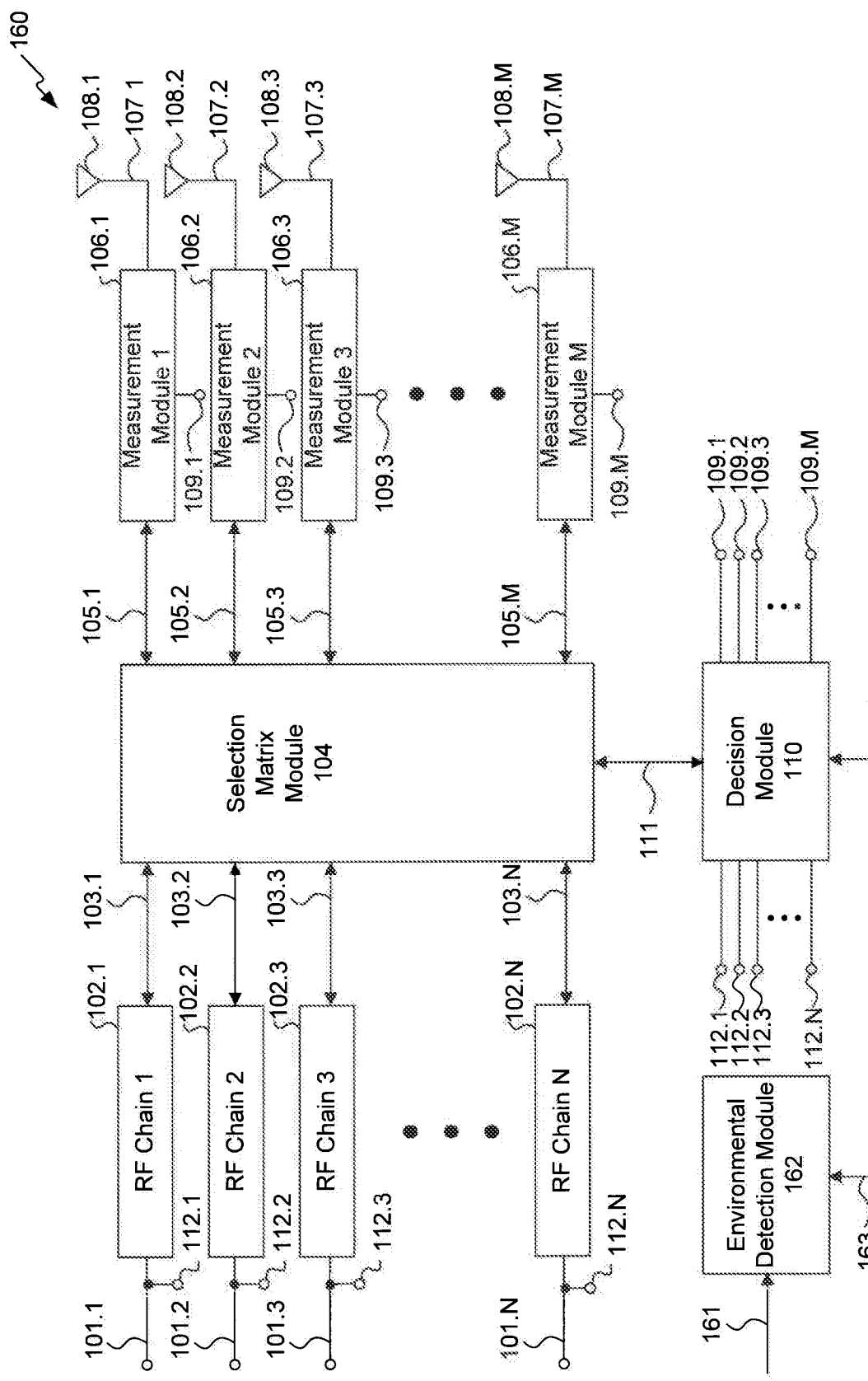
FIG. 1C illustrates a MIMO system that utilizes information about the environment around a communication device to select antennas according to an exemplary embodiment of the disclosure.

FIG. 1C illustrates a MIMO communications system 160 that utilizes information related to the environment around a communication device according to an exemplary embodiment of the disclosure. MIMO system 160 includes the same components as MIMO system 100, and additionally includes an environmental detection module 162. MIMO system 160 operates in substantially the same manner as MIMO system 100. Therefore, only differences between MIMO system 100 and MIMO system 160 will be described.

In accordance with an embodiment of the present disclosure, MIMO system 160 may be implemented as part of a UE, such as a smartphone or tablet, for example. In accordance with such an embodiment, antennas 108.1-108.M are located in several different locations of the UE. For example, antennas 108.1-108.M may be located on the sides or back of the UE, or installed in locations proximate to a display screen. Decision module 110 and/or environmental detection module 162 may be configured to correlate antennas 108.1-108.M with a known position of the antennas within the device in which MIMO system 160 is implemented. For example, decision module and/or environmental detection module 162 may associate antenna 108.1 as being positioned behind the UE display, and antenna 108.2 as being positioned at the top of the UE.

Environmental detection module 162 is coupled to decision module 110 via environmental detection module port 163, and to other functional elements of the device in which MIMO system 140 is implemented via environmental detection module port 161. Environmental detection module ports 161 and 163 may be implemented with any number of wired buses and/or transmission lines, for example.

Environmental detection module 162 may be coupled to a processor (e.g., a host processor) within the device in which MIMO system 140 is implemented via environmental detection module port 163, the processor being configured to send information received from various components to environmental detection module 162. Alternatively, or in addition to communicating with a processor, environmental detection module 162 may be coupled to any number of components via environmental detection module port 163 to receive environmental information from the respective components either directly or indirectly.

Information received by environmental detection module 162 may be from any number of sensors and/or communication performance metrics, for example. In an embodiment in which MIMO system 160 is implemented in a smartphone or tablet, environmental detection module 162 may receive information from infrared sensors, movement sensors, positional sensors, light sensors, and/or temperature sensors, for example. Environmental detection module 162 may utilize any number of the communication performance metrics measured by measurement modules 106.1-106.M in addition to, or as an alternative to, such sensor inputs. For example, as previously discussed with reference to FIG. 1B, decision module 110 may determine various environmental conditions proximate to a device in which MIMO system 160 is implemented. Environmental detection module may receive information regarding the communication performance metrics from decision module 110 via ports 112.1-112.N. Using this information, environmental detection module 162 may determine the proximity of the smartphone or tablet to other devices, the three-dimensional orientation of the smartphone or tablet, the ambient temperature, and/or the ambient light around the smartphone or tablet.

As previously discussed with reference with FIG. 1B, decision module 110 may be configured to associate any of the antennas 108.1-108.M to a physical location. Decision module 110 may control selection matrix module 104 to select a set of antennas based on information received from environmental detection module 162. In accordance with an embodiment of the present disclosure, decision module 110 may be programmed with profiles corresponding to environmental trigger conditions. In accordance with such an embodiment, environmental detection module 162 may provide information indicative of a UE, such as a smartphone, for example, being moved close to a user's head to start a conversation. Using information indicative of this change in environment, decision module 110 may cause selection matrix module 104 to select a profile associated with a subset of antennas from antennas 108.1-108.M that are located to provide better communications performance based on the position of the UE. To provide another example, using light and/or temperature information, decision module 110 may determine that the UE has moved away from the user's head once the call is terminated and placed in the user's pocket. Environmental detection module 162 may use this environmental information to select another profile associated with another subset of antennas from antennas 108.1-108.M that are located to provide better communications performance based on the UE being in the user's pocket.

In an exemplary embodiment of the present disclosure, decision module 110 utilizes the communication performance metrics to determine a physical environment proximate to a device in which MIMO system 162 is implemented. For example, decision module 110 may monitor the communication performance metrics over time. During such monitoring, decision module 110 may measure signal power from a particular source that is known to be outdoors (e.g., a base station), and thus determine whether a device in which MIMO system 162 is implemented has entered a covered or indoor area or has remained outside. To provide another example, decision module 110 may determine movement to an indoor location by a presence of one or more access points that are known to be located indoors. Using this determination, decision module 110 may control selection matrix module 104 to adjust one or more transmission signal parameters and/or transmission profiles. For example, once decision module 110 has determined that a device in which MIMO system 162 is implemented has moved inside, decision module 110 may control selection matrix module 104 to adjust the transmission profile and/or transmission parameters to spatial multiplexing with rank 1 and/or a low coding rate to better suit such a physical environment.

The association of one or more antennas 108.1-108.M with respective communication profiles, the application of transmission parameters, and/or the application of transmission profiles may be predetermined or dynamic. To provide an example, one or more antennas from antennas 108.1-108.M may be associated with a "phone call" profile, which are positioned to provide better communications performance when the smartphone is held close to a user's head. To provide another example, one or more antennas from antennas 108.1-108.M may be associated with a "typing" profile, which are positioned to provide better communications performance when the smartphone is held in a user's hands. The position of the smartphone may be determined, as previously discussed with reference to FIG. 1B, from an analysis of the communication performance metrics by any combination of decision module 110 and/or environmental detection module 162. To provide a further example, physical environmental conditions, such as the device in which MIMO system 160 is implemented, may be associated with one or more transmission parameter and/or transmission profiles.

The antennas associated with the respective communications profiles may be changed at any time. Based on information regarding the location and/or performance of individual antennas, decision module 110 may learn which of the antennas 108.1-108.M are associated with the best communications performance. Decision module 110 may then modify and/or create new respective profiles based on such information.

In accordance with an exemplary embodiment of the present disclosure, decision module 110 is configured to utilize knowledge of ongoing processes within a device in which MIMO system 140 is implemented to determine device activities and create and/or modify profiles based on those activities. For example, decision module 110 may be configured to determine UE activities such as texting or voice communications. Decision module 110 may receive this information from another processor (e.g., a host processor) that executes applications to support these activities, for example. Decision module 110 may determine such activities based on the communication performance metrics. For example, decision module 110 may detect an increased power coupled into those antennas 108.1-108.M that are unused from transmissions that are reflected from those antennas 108.1-108.M that are used. In other words, the physical presence of a user's hands and/or face may cause transmitted signals to couple back into the device in which MIMO system 162 is implemented. The appropriate communications wiring, buses, and couplings from decision module 110 to another processor is not shown in FIG. 1C. Decision module 110 may be configured to compare communication performance metrics and/or operational parameters during these activities, and to modify and/or create profiles associated with the antennas which provide improved communications performance for each activity.

Activities performed by the same user should generally provide some degree of repeatability regarding communication performance metrics for the same activity. However, the same activity performed by different users may result in different communications performance using the same set of associated antennas. This may be due, for example, to differences in hand and/or head size between users. Therefore, in accordance with an embodiment of the present disclosure, decision module 110 utilizes environmental information received from environmental detection module 162 and also associates an identified activity with a profile based on a particular user. For example, if the UE is a tablet device, one or more users may log in to the tablet to use it. In accordance with such an embodiment, decision module 110 is configured to modify and/or create antenna selection profiles based on communication performance metrics associated with these different users. For example, decision module 110 may associate antennas 108.1 and 108.2 as those antennas which provide the best communications performance when user A is typing, but associate antennas 108.1 and 108.3 as those antennas which provide the best communications performance when user B is typing.

Although the previously described ports and communication interfaces are illustrated as single lines, any of these ports and/or interfaces may be implemented with any number of wires, buses, and/or transmission lines. For example, ports 103.1-103.N and 105.1-105.M may be configured as separate transmit and receive ports. For the sake of clarity, these ports are illustrated as single lines. Furthermore, measurement ports 109.1-109.M may similarly be implemented with any collection of buses, wires, and/or transmission lines to provide parallel and/or separate processing of more than one communications performance metric from measurement modules 106.1-106.M. Additionally, decision module port 111 may likewise include any number of ports, wires, buses, and/or transmission lines to facilitate any type of communications between selection matrix module 104 and decision module 110. For example, decision module port 111 may include a single port for supporting serial communications, or multiple ports for supporting parallel communications.

Although FIGS. 1B-1C illustrate control module 142 and environmental detection module 162 separately, either of MIMO systems 140 or 160 may include both control module 142 and environmental detection module 162. In an exemplary embodiment of the present disclosure, MIMO system 160 includes both control module 142 and environmental detection module 162. In accordance with such an embodiment, decision module 110 is coupled to both control module 142 and to environmental detection module 162. Further in accordance with such an embodiment, decision module 110 may utilize any combination of environmental conditions calculated from the communications performance metrics and/or detected via environmental detection module 162. Decision module may adjust one or more settings, transmission parameters, and/or transmission profiles based on any combination of environmental conditions, operating parameters, and/or the communications performance metrics.

Although many of the examples provided throughout this disclosure are given in the context of the respective MIMO system being utilized in a UE such as a smartphone or tablet, the embodiments and descriptions are not limited in this way. For example, any of the embodiments and/or descriptions throughout this disclosure may be applicable to any device that utilizes a MIMO system for communications, such as a base station, for example.

Figure 2A:
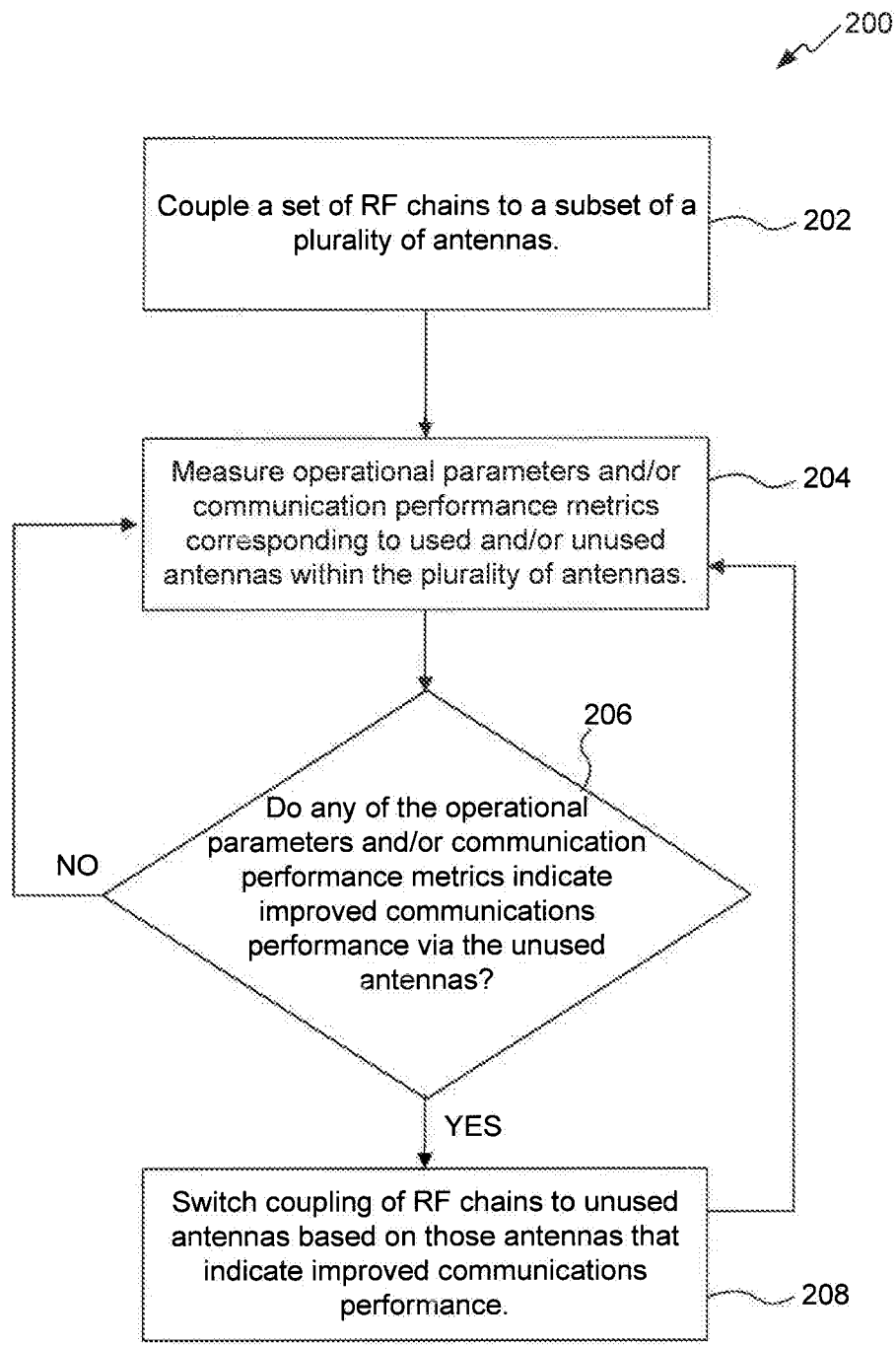
FIG. 2A illustrates a process according to an exemplary embodiment of the disclosure.

FIG. 2A illustrates process 200 according to an exemplary embodiment of the disclosure. The disclosure is not limited to this operational description. Rather, it will be apparent to persons skilled in the relevant art(s) from the teachings herein that other processes are within the scope and spirit of the present disclosure. The following discussion describes the steps in FIG. 2A. Process 200 may be implemented in a MIMO system, such as MIMO system 100, for example.

Process 200 begins at step 202, which includes coupling a set of RF chains to a set of a plurality of antennas.

At step 204, process 200 includes measuring operational parameters corresponding to the set of RF chains that are coupled to the subset of antennas. Alternatively, or in addition to the measurement of the operational parameters, step 204 may further include measuring one or more communication performance metrics corresponding to any antenna of the plurality of antennas. The communication performance metrics may correspond to those antennas of the plurality of antennas that are used for communications, or those antennas of the plurality of antennas that are not being used for communications. As previously discussed, measurements may be performed by any measurement modules, such as measurement modules 106.1-106.M, for example.

At step 206, process 200 includes comparing the operational parameters and/or communication performance metrics corresponding to used antennas with those corresponding to unused antennas. Based on the comparison, process 200 determines if switching any of the RF chains from the used antennas to one or more of the unused antennas would result in improved communications performance. If so, process 200 proceeds to step 208. If not, process 200 returns to step 204.

At step 208, process 200 includes switching one or more of the set of RF chains from a used antenna to an unused antenna. Once one or more of the set of RF chains is switched, process 200 returns to step 204.

Figure 2B:
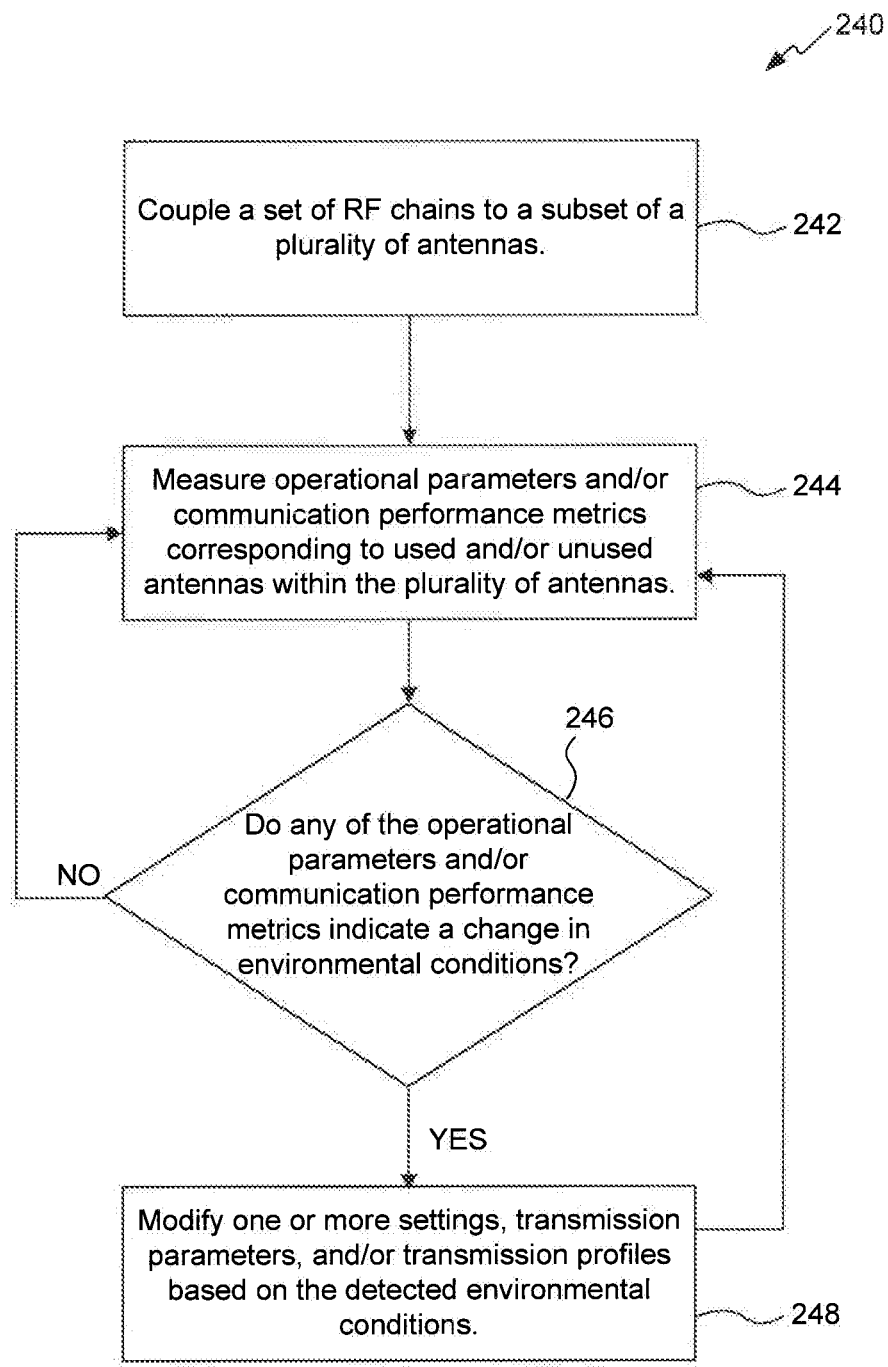
FIG. 2B illustrates a process according to an exemplary embodiment of the disclosure.

FIG. 2B illustrates process 240 according to an exemplary embodiment of the disclosure. The disclosure is not limited to this operational description. Rather, it will be apparent to persons skilled in the relevant art(s) from the teachings herein that other processes are within the scope and spirit of the present disclosure. The following discussion describes the steps in FIG. 2A. Process 240 may be implemented in a MIMO system, such as MIMO system 140, for example.

Steps 242 and 244 are substantially similar to steps 202 and 204, respectively, described above with reference to FIG. 2A. Once step 244 has completed, process 240 proceeds to step 246.

In step 246, process 240 includes determining whether the operational parameters and/or communication performance metrics indicate a change in environmental conditions around the device in which the MIMO system, such as MIMO system 140, for example, is implemented. If the answer is yes, then process 240 proceeds to step 248. Otherwise, process 240 reverts back to step 244.

In step 248, process 240 includes modifying one or more settings, transmission parameters, and/or transmission profiles based on the detected environmental conditions in which the MIMO system is implemented. Once the one or more settings, transmission parameters, and/or transmission profiles are modified, process 240 reverts back to step 244.

Figure 2C:
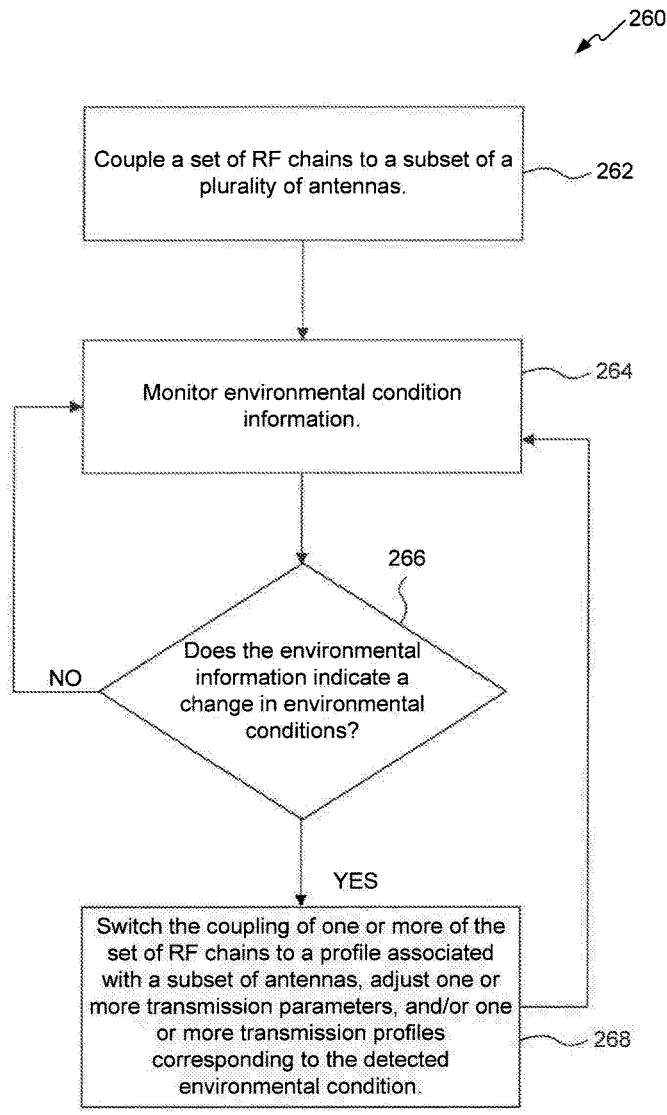
FIG. 2C illustrates a process according to an exemplary embodiment of the disclosure.

FIG. 2C illustrates a process 260 according to an exemplary embodiment of the disclosure. The disclosure is not limited to this operational description. Rather, it will be apparent to persons skilled in the relevant art(s) from the teachings herein that other processes are within the scope and spirit of the present disclosure. The following discussion describes the steps in FIG. 2C. Process 240 may be implemented in a MIMO system, such as MIMO system 160, for example.

Step 262 is substantially similar to step 202 as described with reference to FIG. 2A. Once step 262 has completed, process 260 proceeds to step 264.

In step 264, process 260 includes monitoring information representative of environmental conditions around the device in which the MIMO system, such as MIMO system 160, for example, is implemented. This information may be received from any number of sensors, for example.

In step 266, process 260 includes determining whether the environmental information is indicative of a change in environment around the device. If the answer is yes, process 260 proceeds to step 268. Otherwise, process 260 reverts back to step 264.

In step 268, process 260 includes switching the coupling of one or more of the set of RF chains to a profile associated with a subset of antennas that correspond to the detected environmental condition, adjusting one or more transmission parameters and/or one or more transmission profiles corresponding to the detected environmental condition. Once the antennas are so coupled, the transmission parameters and/or transmission profiles are adjusted, process 260 reverts back to step 264.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail may be made therein without departing from the spirit and scope of the disclosure. Thus the disclosure should not be limited by any of the above-described exemplary embodiments, but should be defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. A communication device, comprising:
   a radio frequency (RF) chain configured to be selectively coupled to a first antenna of a plurality of antennas to enable communications between the communication device and another communication device;
   a measurement module configured to measure a communication performance metric utilizing a second antenna from among the plurality of antennas that is not used for communicating with the other communication device, the communication performance metric corresponding to communications between the communication device and the other communication device via the first antenna; and
   a decision module configured to selectively control switching the coupling of the RF chain from the first antenna to another antenna of the plurality of antennas based on the communication performance metric.

2. The communications device of claim 1, wherein the other antenna is the second antenna.

3. The communication device of claim 1, wherein the communication performance metric includes at least one of:
   a standing wave ratio (SWR);
   a received signal strength indication (RSSI);
   a signal-to-noise ratio (SNR);
   a signal-to-noise-plus-interference ratio (SINR); or
   a bit-error rate (BER).

4. The communication device of claim 1, further comprising:
   a control module, coupled to the decision module, configured to utilize the communication performance metric to control a setting of the communication device.

5. The communication device of claim 4, wherein the communication device is a handheld mobile device, and wherein the setting includes at least one of:
   a screen brightness setting;
   a power setting;
   a sound setting; or
   a radio setting.

6. The communication device of claim 1, wherein communications via the first antenna and the other antenna represent first and second communication profiles, respectively, the communication device further comprising:
   an environmental detection module, coupled to the decision module, configured to sense an environmental condition of the communication device, and
   wherein the decision module is further configured to control switching the RF chain coupling between the first and second communication profiles based changes in the environmental condition.

7. The communication device of claim 6, wherein the environmental condition includes at least one of:
   proximity of the communication device to other objects;
   ambient light levels surrounding the communication device;
   ambient temperature surrounding the communication device;
   a presence of base stations communicating with the communication device; or
   a physical environment of the communication device.

8. A communication device, comprising:
   a plurality of RF chains configured to be selectively coupled to a first subset of antennas from among a plurality of antennas to enable signal transmissions via the first subset of antennas;
   a plurality of measurement modules, at least one measurement module from among the plurality of measurement modules configured to measure a transmission signal metric of one or more antennas of the first subset of antennas utilizing a respective antenna within a second subset of antennas from among the plurality of antennas, the second subset of antennas not being used for signal transmission; and
   a decision module configured to control switching the coupling of at least one of the plurality of RF chains from the first subset of antennas to another subset of antennas from among the plurality of antennas based on the transmission signal metric.

9. The communication device of claim 8, wherein the other subset of antennas is the second subset of antennas.

10. The communication device of claim 8, wherein the transmission signal metric include at least one of:
    a standing wave ratio (SWR);
    a signal-to-noise ratio (SNR);
    a signal-to-noise-plus-interference ratio (SINR); or
    a bit-error rate (BER).

11. The communication device of claim 8, further comprising:
    a control module configured to utilize the signal transmission metric to control a setting of the communication device.

12. The communication device of claim 11, wherein the communication device is a handheld mobile device, and wherein the setting includes at least one of:
    a screen brightness setting;
    a power setting;
    a volume setting; or
    a radio setting.

13. The communication device of claim 8, wherein communications via the first antenna subset and the other antenna subset represent first and second communication profiles, respectively, the communication device further comprising:
    an environmental detection module, coupled to the decision module, configured to sense an environmental condition of the communication device, and
    wherein the decision module is further configured to control the switching of the coupling of the at least one of the plurality of RF chains between the first and second communication profiles based on the environmental condition.

14. The communication device of claim 13, wherein the environmental condition includes at least one of:
    proximity of the communication device to other objects;
    ambient light levels surrounding the communication device;
    ambient temperature surrounding the communication device;
    a presence of base stations communicating with the communication device; or
    a physical environment of the communication device.

15. In a communication device, a method of selecting antennas within a multiple input multiple output (MIMO) system for communications with another communication device, comprising:
    coupling a radio frequency (RF) chain to a first antenna of a plurality of antennas;
    measuring a communication performance metric of the first antenna utilizing a second antenna that is not being utilized for the communications between the communication device and the other communication device; and
    determining if switching the coupling of the RF chain from the first antenna to another antenna within the plurality of antennas would result in improved communications performance based on the communication performance metric.

16. The method of claim 15, further comprising:
switching coupling of the RF chain to the other antenna based on the determination.

17. The method of claim 15, wherein the other antenna is the second antenna.

18. The method of claim 15, further comprising:
controlling a setting of the communication device based on the communication performance metric.

19. The method of claim 15, wherein communications via the first antenna and the other antenna represents first and second communication profiles, respectively, the method further comprising:
 detecting an environmental condition of the communication device; and
 switching the coupling of the RF chain between the first and second communication profiles based on changes in the environmental condition.

20. The method of claim 15, wherein transmissions to the other communication device utilize one of a first or a second transmission profile, the method further comprising:
 detecting an environmental condition of the communication device; and
 switching between the first and second transmission profiles based on changes in the environmental condition.

* * * * *